United States Patent [19]

Janzer

[11] Patent Number: 4,776,082

[45] Date of Patent: Oct. 11, 1988

[54] ELECTRIC MOTOR REPAIR

[75] Inventor: Gerald J. Janzer, N. Granby, Conn.

[73] Assignee: Otis Elevator Company, Farmington, Conn.

[21] Appl. No.: 497,288

[22] Filed: Oct. 11, 1988

[51] Int. Cl.⁴ ............................................. H02K 15/02
[52] U.S. Cl. .................................... 29/598; 29/402.18; 156/94; 156/294; 310/42; 310/43; 310/45
[58] Field of Search ............... 29/598, 402.18; 156/94, 156/294; 310/42, 43, 45, 261, 217

[56] References Cited

U.S. PATENT DOCUMENTS

| | | | |
|---|---|---|---|
| 2,040,126 | 5/1936 | Grieve | 29/402.18 X |
| 2,266,702 | 12/1941 | Byers | 29/402.18 X |
| 3,204,134 | 8/1965 | Schneider | 310/45 X |
| 3,737,987 | 6/1973 | Bednarski | 29/598 X |

Primary Examiner—Carl E. Hall

[57] ABSTRACT

An electric motor armature is repaired, to correct a loose armature or separated armature laminations, by drilling holes through the armature at various locations around the armature and along its length. The holes extend to the armature shaft. Adhesive is injected into the holes, under pressure, and fills any voids between the laminations and between the armature and the shaft.

3 Claims, 1 Drawing Sheet

ELECTRIC MOTOR REPAIR

DESCRIPTION

TECHNICAL FIELD

This invention concerns repair of electric motor armatures.

BACKGROUND ART

An electric motor armature is usually made of a stack of metal laminations mounted on the motor shaft. The armature windings are wound on the lamination. Sometimes the laminations become loose on the shaft; sometimes the laminations separate slightly over time. As a result of one or both, the motor may become noisy or develop slight vibrations, or the armature connections may break at the commutator riser.

Armature repair can be difficult and expensive. The motor may be out of use for a considerable period of time. Sometimes the armature has to be replaced, if it cannot be disassembled, rewound, and then reassembled easily or inexpensively. It can be advantageous, for instance, with elevators, to be able to make these repairs in the field, to minimize cost and inconvenience.

DISCLOSURE OF THE INVENTION

According to the present invention, bore holes are drilled through the armature laminations to the shaft at various positions on the armature, each hole providing an external path through the armature laminations to the shaft and to the lamination layers. Adhesive is then inserted under pressure. It fills any voids between the laminations and the shaft and is allowed to cure, creating a secure, uniform bond between the laminations and between the shaft and the armature.

A feature of the invention is that it provides a very convenient, inexpensive technique for bonding the armature to the motor shaft and bonding the laminations to each other; a technique that can be employed during manufacture or in the field.

BEST MODE FOR CARRYING OUT THE INVENTION

Figure 1:
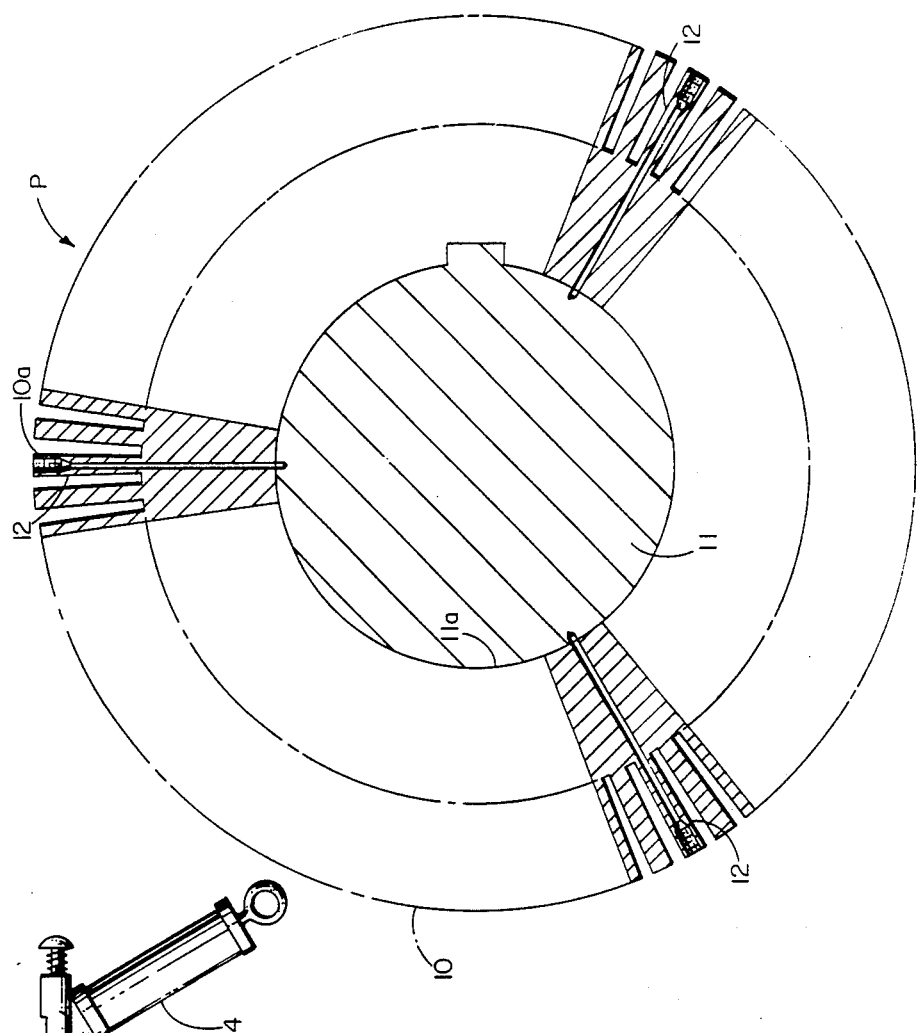
FIG. 1 is a cross-sectional view of a motor armature, exclusive of the armature windings.

FIG. 1 shows a motor armature 10, on a shaft 11, as seen if looking down axially along the motor shaft. The armature is made up of a number of laminations forming a cylindrical stack. The armature 10 has slots between portions 10a, along its entire perimeter (360° around). In FIG. 1, however, only a portion of the slots, around the armature, are shown for convenience. The slots normally contain the armature windings, but these are not shown, also for convenience. The windings, if shown, would fit within the slots and they would be wound in a configuration that depends upon the desired motor winding parameters. This is well known, of course.

In understanding the present invention, this should be realized: the armatures are made up of a stack of metal sheets that should be held tightly together; this stack forms the armature, which should be tightly attached to the motor shaft 11; and motor vibration and noise can increase if either, or both, the armature loosens on the shaft 11 or the laminations separate.

According to the present invention, a bore hole 12 is drilled through the armature, all the way to the shaft. In FIG. 1, three of these holes are shown, separated approximately 120° apart on a common circumferential plane P. The spacing is largely arbitrary. The criteria is adequate access to the shaft and the laminations. Similar holes may be placed axially along the armature, e.g., 1 inch apart, to provide access to the shaft along the entire armature. The holes provide access to the space 11a between the shaft and the armature, and this space, though small, also provides access to the laminations around it.

Figure 2:
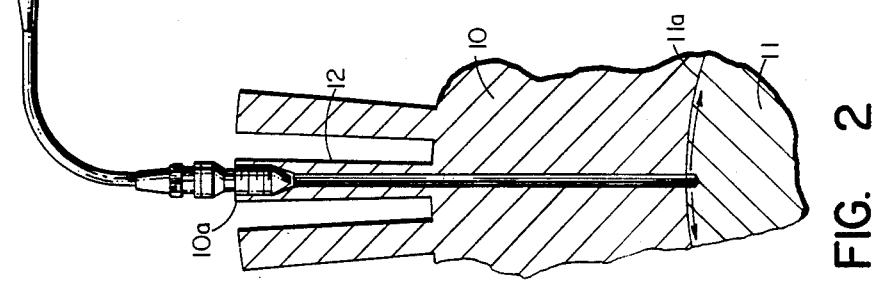
FIG. 2, also an elevational view, but of a portion of the armature, shows a pneumatic tool which is connected to a hole armature.

FIG. 2 shows a small portion of the armature 10. One hole 12 is shown there, and, like the others in FIG. 1, it extends through the armature to the shaft 11. According to the invention, adhesive is inserted under pressure through the hole, preferably using pressure gun 14. The gun is screwed into the outermost portion of the bore hole 12, which is suitably threaded for this purpose. The adhesive is forced into the hole 12, flowing within space area 11a and any void within any immediate laminations. The adhesive is similarly applied through each bore hole 12, and the entire space between the shaft and the armature is filled with adhesive, as a result of the process. Once the adhesive cures, the armature is tightly bonded to the shaft and the laminations are tightly bonded to each other.

This procedure merely requires disassembling the motor in the field to the extent necessary to drill the bore holes and apply the adhesive. The motor is not out of use for any extended period of time; only for the time required to drill the holes, apply the adhesive and allow the adhesive to cure. Obviously, various different types of adhesives can be used. A fast curing adhesive, such as the anaerobic type, is recommended.

The invention may be utilized during manufacture, of course. The holes may be drilled so the adhesive can be applied in the field if noise and vibration develop, or adhesive may be applied to the armature in the manner embraced by the present invention in order to attach the armature more securely to the shaft during manufacture. Still, other modifications, variations, alterations and applications of the present invention will be obvious to one skilled in the art from the foregoing description and explanation of the invention without departing from the true scope and spirit of the invention.

I claim:

1. For repairing an electric motor with an armature comprising a stack of laminations mounted to a shaft, the method characterized by the steps:
   (a) disassembling the motor to expose the armature;
   (b) drilling a hole through the armature to the motor shaft at one or more locations around the armature and along the length of the armature;
   (c) injecting, under pressure, an adhesive material into each hole;
   (d) reassembling the motor.

2. The method described in claim 1, characterized in that step (b) comprises drilling at least three holes, 120° apart, around the armature on a common circumferential plane.

3. The method described in claim 1, characterized in that step (c) comprises injecting an anaerobic adhesive.

* * * * *

UNITED STATES PATENT AND TRADEMARK OFFICE
CERTIFICATE OF CORRECTION

PATENT NO. : 4,776,082

DATED : October 11, 1988

INVENTOR(S) : Gerald J. Janzer

It is certified that error appears in the above-identified patent and that said Letters Patent is hereby corrected as shown below:

In column 1, Filed: "Oct. 11, 1988" should read --May 23, 1983-

Signed and Sealed this

Nineteenth Day of December, 1989

Attest:

JEFFREY M. SAMUELS

*Attesting Officer*  *Acting Commissioner of Patents and Trademarks*